United States Patent [19]
Nakane et al.

[11] 4,085,969
[45] Apr. 25, 1978

[54] HINGE FITTING FOR ADJUSTABLE BACK RESTS OF VEHICLE SEATS

[75] Inventors: Mototaka Nakane, Hekinan; Takami Terada, Toyota, both of Japan

[73] Assignee: Aisin Seiki Kabushiki Kaisha, Japan

[21] Appl. No.: 727,421

[22] Filed: Sep. 28, 1976

[30] Foreign Application Priority Data

Oct. 7, 1975  Japan ................................ 50-121463

[51] Int. Cl.² ............................................. B60N 1/02
[52] U.S. Cl. ...................................... 297/367; 16/146
[58] Field of Search ............... 297/366, 367, 368, 369; 16/146

[56] References Cited

U.S. PATENT DOCUMENTS

| | | | |
|---|---|---|---|
| 3,309,139 | 3/1967 | Turner et al. | 297/367 |
| 3,901,100 | 8/1975 | Iida et al. | 297/367 X |
| 3,902,757 | 9/1975 | Yoshimura | 297/367 |
| 3,953,069 | 4/1976 | Tamura et al. | 297/367 |
| 3,958,828 | 5/1976 | Ishida et al. | 297/367 |
| 3,966,253 | 6/1976 | Berghof et al. | 297/367 |

FOREIGN PATENT DOCUMENTS

2,254,199  7/1975  France ................................ 297/367

*Primary Examiner*—Roy D. Frazier
*Assistant Examiner*—Peter A. Aschenbrenner
*Attorney, Agent, or Firm*—Oblon, Fisher, Spviak, McClelland & Maier

[57] ABSTRACT

A hinge fitting for adjusting the inclination of the back rest of a vehicle seat comprises a stationary hinge plate secured to the seat, a movable hinge plate pivoted to the stationary hinge plate and secured to the back rest, a semicircularly toothed internal rack secured within the stationary hinge plate, a pawl lever swingably pivoted on the inside of the movable hinge plate and including a detent element swingable at the outside of the movable hinge plate to be meshed with the teeth of the rack in a vertical common plane, the pivot position of the pawl lever being arranged on a tangent of the semicircularly aligned teeth of the rack, and a spring loaded locking lever pivoted coaxially with the hinge plates and movable between a locked position in which the detent element is engaged with the rack by engagement of the locking lever against the detent element and a released position in which the detent element is disengaged from the rack by engagement of the locking lever against the pawl lever.

7 Claims, 3 Drawing Figures

HINGE FITTING FOR ADJUSTABLE BACK RESTS OF VEHICLE SEATS

BACKGROUND OF THE INVENTION

The present invention relates to a hinge fitting for adjusting the inclination of the back rest of a vehicle seat, and more particularly to an improvement of a locking means for the hinge fitting.

SUMMARY OF THE INVENTION

The primary object of the present invention is to provide a locking means for a hinge fitting wherein firm engagement of a detent element against an internal toothed rack is ensured in a simple assembling construction to lock a movable hinge plate against a stationary hinge plate in different angular positions.

Another object of the present invention is to provide a locking means for a hinge fitting wherein a semicircularly toothed internal rack is secured within a first hinge plate and a pawl lever is swingably pivoted on the inside of a second hinge plate pivoted to the first hinge plate and includes a detent element swingable at the outside of the second hinge plate to be engaged with the teeth of the rack in a vertical common plane, the pivot position of the pawl lever being arranged on a tangent of the semicircularly aligned teeth of the rack to provide linear engagement of the detent element with the teeth of the rack, and wherein a locking lever is rotatably mounted on a pivot pin connecting the hinge plates to each other to be movable between a locked position in which the detent element is engaged with the teeth of the rack by engagement of the locking lever against the detent element and a released position in which the detent element is disengaged from the teeth of the rack by engagement of the locking lever against the pawl lever.

A further object of the present invention is to provide a locking means for a hinge fitting, having the above-mentioned characteristics, wherein a lateral pin is secured to the detent element and slidably guided within an elongated slot provided on a portion of the second hinge plate to reinforce the assembling of the pawl lever.

BRIEF DESCRIPTION OF THE DRAWINGS

With these and other object in view which will become apparent in the following detailed description, the present invention will be clearly understood in connection with the accompanying drawings, in which.

DESCRIPTION OF THE PREFERRED EMBODIMENT

Figure 1:
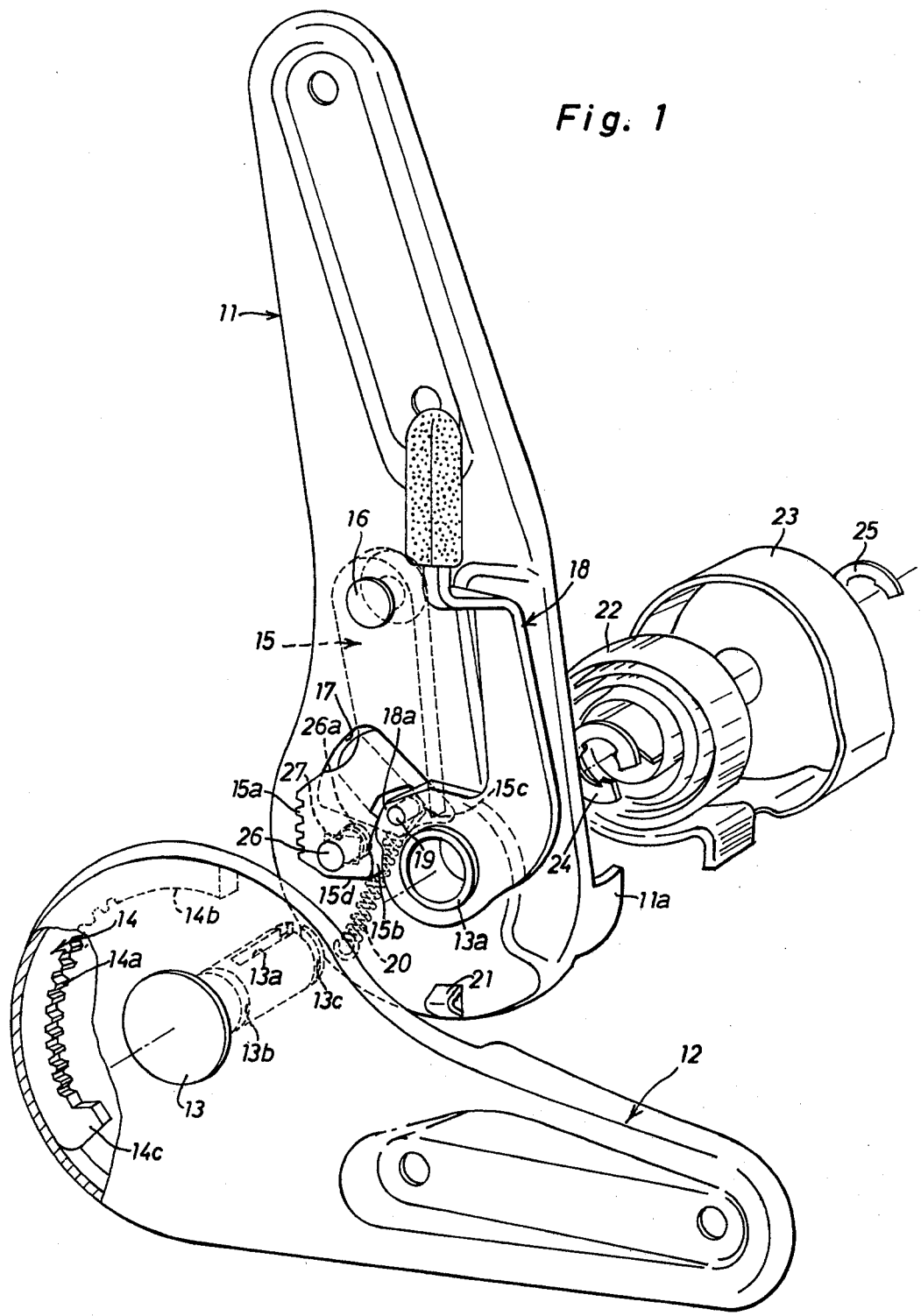
FIG. 1 is a schematic perspective view of the disassembled parts of a hinge fitting in accordance with the present invention.

Referring now to the drawings, particularly in FIG. 1 there is illustrated a hinge fitting for adjusting the inclination of the back rest of a front seat for a motor vehicle which comprises a movable hinge plate 11 and a stationary hinge plate 12 which are to be secured to one side of the back rest and the seat, respectively. The hinge plates 11 and 12 are pivotably connected to each other by means of a pivot pin 13 which is rigidly secured to the hinge plate 12. The movable hinge plate 11 may be adjusted at different angular positions relative to the stationary hinge plate 12. The stationary hinge plate 12 is provided with a semicircularly toothed internal rack 14 secured thereto to be engaged with teeth 15a of a pawl lever 15.

Figure 2:
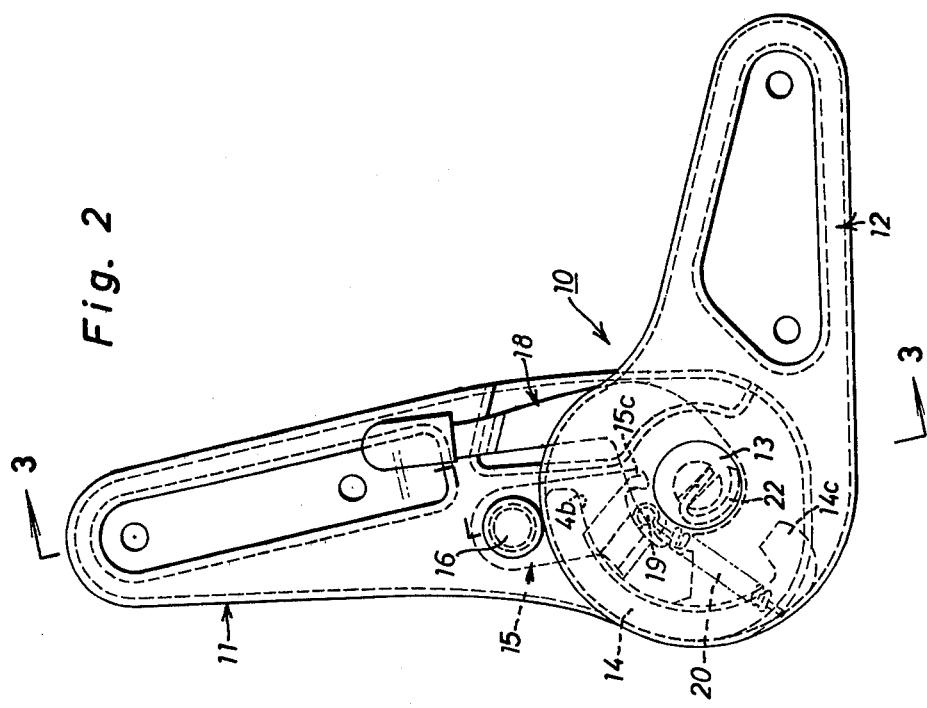
FIG. 2 is a front view of the assembled hinge fitting shown in FIG. 1.
Figure 3:
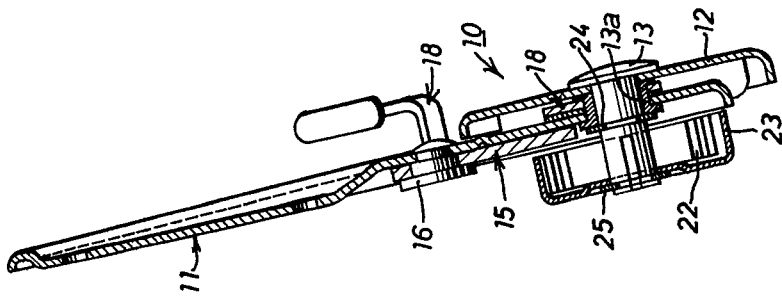
FIG. 3 is a vertical cross-sectional view taken along line 3—3 of FIG. 2.

The pawl lever 15 is swingably pivoted on the back side of the movable hinge plate 11 by means of a pivot pin 16 and has a detent portion extended toward the front side of the plate 11 through an opening window 17. The extended detent portion of the lever 15 is provided at one side thereof with the teeth 15a engageable with the teeth 14a of the rack 14 and further provided at the other side thereof with a cam surface 15b. The pawl lever 15 further includes a hook 15c located at the back side of the hinge plate 11 and a lateral pin 26 secured to the detent portion and extended toward the back side of the hinge plate 11 through a rectangular opening 27 which is provided on the hinge 11. The lateral pin 26 has a head 26a slidably engaged with the back face of the hinge plate 11 to firmly bear the detent portion of the pawl lever 15 against the hinge plate 11. Thus, when the movable hinge plate 11 is pivotably assembled with the stationary hinge plate 12, the extended detent portion of the pawl lever 15 and the toothed rack 14 are arranged in a vertical common plane such that the teeth 15a of pawl lever 15 is surely engaged with the teeth 14a of rack 14. As shown in FIG. 2, the pivot 16 of pawl lever 15 is arranged on a tangent of the semicircularly aligned teeth 14a of rack 14 to provide linear engagement of the teeth 14a and the teeth 15a. This provides a firm assembling construction of the hinge fitting.

A locking lever designated by reference numeral 18 is rotatably mounted on the pivot pin 13 through a bearing sleeve 13a at the front side of the hinge plate 11 to be moved forwardly or rearwardly. The locking lever 15 is provided at one side thereof with a cam projection 18a engageable with the cam surface 15b of pawl lever 15. The locking lever 18 further includes a lateral pin 19 secured thereto which extends toward the back side of the hinge plate 11 through the opening window 17 to be engaged with the hook 15c of the pawl lever 15. Between the lateral pin 19 and a lower portion of the hinge plate 11, a tension coil spring 20 is stretched to bias the locking lever 18 counterclockwise around the pivot pin 13 so that the cam projection 18a of the lever 18 is resiliently engaged with the cam surface 15b of pawl lever 15 to firmly maintain engagement of the teeth 15a of pawl lever 15 with the teeth 14a of rack 14.

In this assembling, when the locking lever 18 is moved in the forward direction of the seat against biasing force of the coil spring 20, the cam projection 18a disengages from the cam surface 15b of pawl lever 15 and subsequently the lateral pin 19 will engage the hook 15c of pawl lever 15 to swing the pawl lever 15 counterclockwise around the pivot pin 16. This releases the engagement of the teeth 15a of pawl lever 15 with the teeth 14a of rack 14 so that the hinge plate 11 can be inclined in the forward or rearward direction of the seat.

In this embodiment, the internal toothed rack 14 is further provided at the upper portion thereof with a nontoothed arcuate guide 14b and at the lower end thereof with a projected nose 14c engageable with the bottom surface 15d of pawl lever 15. On the other hand, the movable hinge plate 11 is provided at the lower end thereof with a curved projection 21 to be engaged with the nose 14c of rack 14. A spiral spring designated by reference numeral 22 is fixedly accomodated at one end thereof with a radial slot 13a of the pivot pin 13 and hung at the other end thereof on a tongue 11a bent out form the hinge plate 11. Thus, the spiral spring 22 is so arranged that the movable hinge plate 11 tends to swing forwardly around the pivot pin 13 upon releasing of the locking lever 18. Furthermore, a retainer ring clip designated by reference numeral 24 is fixed in an annular groove 13b provided on the pivot pin 13 to retain the hinge plate 11 in the assembled position. A cup-shaped cover designated by reference numeral 23 is mounted on the pivot pin 13 to conceal the assembled spiral spring 22 and a retainer ring clip designated by reference numeral 25 is fixed in an annular groove 13c provided on the outer end of the pivot pin 13 to retain the cover 23 in the assembled position.

In use of the assembled hinge fitting, if the back rest is to be adjusted rearwardly or forwardly from a reclining position, the locking lever 18 is moved by hand against the loading of the tension spring 20 in the forward direction of the seat around the pivot pin 13 to release the cam projection 18a from the cam surface 15b of pawl lever 15 and engage the lateral pin 19 of the lever 18 against the hook 15c of pawl lever 15. This causes counterclockwise movement of the pawl lever 15 to release the meshing engagement of the teeth 15a of pawl lever 15 and the teeth 14a of rack 14 so that the back rest can be moved rearwardly against the loading of the spiral spring 22 or can be moved forwardly under assist of the spiral spring 22. When the back rest is then moved toward the rear or the front and reaches a desired inclined position, the locking lever 18 is released from hand to lock the back rest in the adjusted position. In this instance, the locking lever 18 is turned by returning force of the tension spring 20 to the original position and subsequently the pawl lever 15 is swung clockwise upon engagement of the cam projection 18a of the lever 18 with the cam surface 15b of pawl lever 15 so that the teeth 15a of pawl lever 15 meshes linearly with the teeth 14a of rack 14 to lock the movable hinge plate 11. In this reclining adjustment, if the back rest is moved to the extreme rearward position, the rearward inclination of the back rest is restricted by engagement of the bottom end face 15d of pawl lever 15 against the nose 14c of rack 14.

If the back rest is to be moved to the extreme forward position from a reclining position to facilitate access to the rear seats of a vehicle, upon clockwise movement of the locking lever 18 actuated by hand, as mentioned above, the back rest is inclined toward the extreme forward position by loading of the spiral spring 22. In this instance, the forward inclination of the back rest is restricted by engagement of the projection 21 of the movable hinge plate 11 against the nose 14c of rack 14 and the teeth 15a of pawl lever 15 is slidably received on the arcuate guide 14b of rack 14 when the locking lever 18 is released from hand.

As already described, the construction shown is only an example of how the present invention can be put into practice. The present invention is, however, not restricted thereto, but modifications of the construction illustrated and also other forms of construction are possible. For example, the pawl lever 15 may be formed by two parts one of which is a swing lever pivoted on the back side of the movable hinge plate 11 and the other of which is a detent arranged to be moved at the front side of the hinge plate 11. In this modification, the detent is securely connected in a piece with the swing lever by revetting or welding. It will be also easily recognized that the locking lever and pawl lever assembly may be assembled with the stationary hinge plate 12 and the internal toothed rack 14 may be assembled with the movable hinge plate 11.

What is claimed is:

1. In a hinge fitting for adjusting the inclination of the back rest of a vehicle seat, comprising a pair of hinge plates pivotably connected to each other, a first of said hinge plates adapted to be secured to one side of the seat or the back rest and the second hinge plate to one side of the back rest or the seat; and means for rigidly locking said hinge plates in different angular positions to each other;

the improvement wherein said locking means comprises a semicircularly toothed internal rack secured within said first hinge plate;

a pawl lever swingably pivoted on said second hinge plate and including a detent element swingably meshed with the teeth of said rack in a vertical common plane and a lever portion integrally extended from said detent element via the backside of said rack, the pivot position of said pawl lever being arranged on an outer tangent of the semicircularly aligned teeth of said rack to provide linear engagement of said detent element with the teeth of said rack;

a locking lever pivoted coaxially with said hinge plates and movable between a locked position in which said detent element is engaged with the teeth of said rack by engagement of said locking lever against said detent element and an unlocked position in which said detent element is disengaged from the teeth of said rack by engagement of said locking lever against said pawl lever; and means for biasing said locking lever to maintain the engagement of said locking lever with said detent element.

2. A hinge fitting as claimed in claim 1, wherein said locking lever is pivoted coaxially with said hinge plates to be moved in the forward direction of the seat and provided thereon with a lateral pin to be engaged with a hook portion of said pawl lever in releasing operation of said locking lever and a cam projection to be engaged with a cam surface provided on one side of said detent element in locking operation of said locking lever, and wherein said biasing means is a tension spring stretched between said lateral pin and a portion of said second hinge plate for biasing said locking lever in the rearward direction of the seat to resiliently engage the cam projection of said locking lever with the cam surface of said detent element so as to maintain firm engagement of said detent element against the teeth of said rack.

3. A hinge fitting as claimed in claim 1, wherein said second hinge plate is provided thereon with an elongated slot located at the back side of said detent element and said detent element is provided thereon with a lateral pin extending through said slot toward the inside of said second hinge plate, said lateral pin having a head engageable with the inside face of said second hinge plate.

4. A hinge fitting as claimed in claim 1, wherein said detent element is integrally extended from said pawl lever through an opening provided on said second hinge plate.

5. A hinge fitting as claimed in claim 1, wherein said semicircularly toothed rack is provided at one end thereof with a projection to be engaged with said detent element when the back rest is moved toward the extreme rearward position, whereby the rearward inclination of the back rest is restricted by engagement of said detent element against the projection of said rack.

6. A hinge fitting as claimed in claim 5, wherein said second hinge plate is provided thereon with a projection to be engaged with the projection of said rack when the back rest is moved toward the extreme forward position, whereby the forward inclination of the back rest is restricted by engagement of the projections of said rack and said second hinge plate.

7. A hinge fitting as claimed in claim 6, wherein said internal toothed rack is provided at the other end thereof with a non-toothed portion to receive the teeth of said detent element thereon when the back rest is moved toward the extreme forward position.

* * * * *